(12) United States Patent
Oowatari et al.

(10) Patent No.: US 7,602,093 B2
(45) Date of Patent: Oct. 13, 2009

(54) VEHICLE ALTERNATOR AND STATOR FOR VEHICLE ALTERNATOR

(75) Inventors: Shinya Oowatari, Anjo (JP); Tooru Ooiwa, Toyota (JP)

(73) Assignee: Denso Corporation, Kariya (JP)

( * ) Notice: Subject to any disclaimer, the term of this patent is extended or adjusted under 35 U.S.C. 154(b) by 357 days.

(21) Appl. No.: 11/634,139

(22) Filed: Dec. 6, 2006

(65) Prior Publication Data
US 2007/0200448 A1  Aug. 30, 2007

(30) Foreign Application Priority Data
Feb. 24, 2006  (JP) ............... 2006-049091

(51) Int. Cl.
H02K 3/12 (2006.01)
H02K 19/16 (2006.01)
H02K 3/24 (2006.01)

(52) U.S. Cl. ............... 310/201; 310/58; 310/180; 310/184

(58) Field of Classification Search ............... 310/58, 310/180, 184, 179, 201
See application file for complete search history.

(56) References Cited

U.S. PATENT DOCUMENTS

| | | | |
|---|---|---|---|
| 5,936,326 A | 8/1999 | Umeda et al. | |
| 5,952,749 A | 9/1999 | Umeda et al. | |
| 5,955,810 A | 9/1999 | Umeda et al. | |
| 5,965,965 A | 10/1999 | Umeda et al. | |
| 5,982,068 A | 11/1999 | Umeda et al. | |
| 5,986,375 A | 11/1999 | Umeda et al. | |
| 5,994,813 A | 11/1999 | Umeda et al. | |
| 5,998,903 A | 12/1999 | Umeda et al. | |
| 6,011,332 A | 1/2000 | Umeda et al. | |
| 6,020,669 A | 2/2000 | Umeda et al. | |
| 6,049,154 A | 4/2000 | Asao et al. | |
| 6,051,906 A | 4/2000 | Umeda et al. | |
| 6,091,169 A | 7/2000 | Umeda et al. | |
| 6,097,130 A | 8/2000 | Umeda et al. | |
| 6,124,660 A | 9/2000 | Umeda et al. | |
| 6,137,201 A | 10/2000 | Umeda et al. | |
| 6,144,136 A | 11/2000 | Umeda et al. | |
| 6,181,043 B1 | 1/2001 | Kusase et al. | |
| 6,181,045 B1 | 1/2001 | Umeda et al. | |
| 6,198,190 B1 | 3/2001 | Umeda et al. | |
| 6,252,326 B1 | 6/2001 | Umeda et al. | |
| 6,291,918 B1 | 9/2001 | Umeda et al. | |

(Continued)

FOREIGN PATENT DOCUMENTS

JP  A-11-299153  10/1999

(Continued)

OTHER PUBLICATIONS

Japanese Office Action for Patent Application 2006-049091, May 26, 2009, pp. 1-2.

*Primary Examiner*—Burton Mullins
(74) *Attorney, Agent, or Firm*—Oliff & Berridge, PLC (57) ABSTRACT

A vehicle alternator and a stator for the vehicle alternator are disclosed wherein a stator winding includes a plurality of base segments wound on slots of the stator, each of the base segments including a large segment and a small segment disposed in the same slots distanced from each other by one-pole pitch. The large and small segments have turning portions extending from one axial end of the stator to form coil ends, respectively, with the turning portions of the large and small segments being dislocated from each other in a circumferential direction of the stator core to provide a circumferential space to create a cooling wind flow path to pass cooling wind in a radial direction of the stator core.

7 Claims, 8 Drawing Sheets

U.S. PATENT DOCUMENTS

6,459,186 B1    10/2002  Umeda et al.
6,476,530 B1 *  11/2002  Nakamura et al. .......... 310/201

FOREIGN PATENT DOCUMENTS

| | | |
|---|---|---|
| JP | A 11-346448 | 12/1999 |
| JP | A 2000-166151 | 6/2000 |
| JP | B2 3407676 | 3/2003 |

\* cited by examiner

VEHICLE ALTERNATOR AND STATOR FOR VEHICLE ALTERNATOR

CROSS REFERENCE TO RELATED APPLICATIONS

This application is related to Japanese Patent Application No. 2006-49091, filed on Feb. 24, 2006, the content of which is hereby incorporated by reference.

BACKGROUND OF THE INVENTION

1. Field of the Invention

The present invention relates to stators of vehicle alternators driven by internal combustion engines and, more particularly, to a stator of a vehicle alternator installed on vehicles such as passenger cars, trucks, or boats and ships.

2. Description of the Related Art

Attempts have heretofore been made to provide vehicle alternators having stator windings of first and second types. The stator winding of the first type includes a continuous wire. The stator winding of the second type includes a segment, made of an electrical conductor preliminarily bent in a hairpin shape (such a bent portion will be hereinafter referred to as a turning portion), which is inserted to slots of the stator after which ends of the segment are joined to each other (see, for instance, Japanese Unexamined Patent Application Publication No. 346448, on pages 3 to 8 and FIGS. 1 to 19: Patent Document I).

With such a structure, the stator winding has coil end groups, axially protruding from axial end faces of the stator core, in one of which a turning portion of a large segment disposed in inner and outer layers of slots is arranged so as to surround a turning portion of a small segment disposed in middles layers of the slots. Since the stator winding is configured such that the turning portion of the large segment surrounds the turning portion of the small segment, the small segment has a less surface area that directly gets cooling wind with the resultant deterioration in cooling efficiency. Therefore, this results in increased heat development in peripherals parts of the turning portion of the small segment, causing degraded heat radiating property of the small segment.

To take measures against such deterioration in cooling efficiency, an attempt has been made to provide a winding structure composed of large and small segments whose turning portions are dislocated from each other in a circumferential direction of a stator core to provide improved cooling efficiency (see, for instance, Japanese Patent No. 3407676 on pages 3 to 5 and FIGS. 1 to 7: Patent Document II).

With the winding structure disclosed in Patent Document II, since a height of a coil end of the turning portion of the large segment depends on a height of a coil end of the turning portion of the small segment, a difficulty is encountered in reducing a height of the turning portion. Therefore, an issue has arisen with a difficulty of shortening a length of a winding to decrease a resistance value of the winding for the purpose of suppressing an increase in heat development and increasing an output of the alternator. In addition, resistance in airflow around a frame surrounding the coil end cannot be decreased and in maintaining a physical constitution of the vehicle alternator, an issue arises with a difficulty of increasing the flow rate of cooling wind.

SUMMARY OF THE INVENTION

The present invention has been completed with a view to addressing the above issues and has an object to provide a stator of a vehicle alternator that can achieve a reduction in a length of a stator winding to provide a decreased resistance value while making it possible to increase the flow rate of cooling wind with improved cooling capability.

To achieve the above object, one aspect of the present invention provides a stator for a vehicle alternator comprising a stator core formed with a plurality of slots, and a multiphase stator winding wound on the plurality of slots of the stator core and including a plurality of segments composed of electrical conductors that are joined to each other to form the stator winding. The segments have inclined portions forming coil ends extending from an axial end face of the stator core. Each of the segments includes a U-shaped large segment having a turning portion with a large size and a U-shaped small segment having a turning portion with a small size. The stator winding has a coil-end group, extending from one axial end face of the stator core, wherein the turning portion of the large segment and the turning portion of the small segment are dislocated from each other in a circumferential direction of the stator core and the turning portions of the large and small segments passing through the same slots overlap each other along an axial direction of the stator core.

With such a structure, the turning portion of the large segment can be bent to the same extent as that in which the turning portion of the small segment is bent, making it possible to decrease axial heights of the turning portions of the segments. Accordingly, this results in an increase in a gap between a frame of the alternator and the stator winding, thereby enabling an increase in the flow rate of cooling wind passing across the coil-end groups while making it possible to provide improved cooling capability. In addition, the turning portion of the large segment can have a decreased axial height with the resultant decrease in a length of an electric conductor needed for the stator winding to be formed. This enables a reduction in a resistance value, while making it possible to reduce cost for producing the stator winding.

With the stator for the vehicle alternator of the present embodiment, the turning portions of the large and small segments passing through the same slots may preferably have the same axial heights.

Decreasing the height of the turning portion of the large segment to a value equal to the axial height of the turning portion of the small segment enables an increase in the flow rate of cooling wind passing across the coil-end groups of the stator winding. Also, the stator winding can have a reduced length to cause a reduction in a resistance value, enabling an increase in cooling capability. In addition, due to the presence of the large and small segments arranged to have the same axial heights, the large and small segments can be inserted to the associated slots at one time, making it possible to simplify the manufacturing process.

With the stator for the vehicle alternator of the present embodiment, the inclined portions of the segments may preferably have circumferential spaces forming cooling wind flow paths to pass cooling wind in a radial direction of the stator core.

Such a structure allows both of the large and small segments to have the coil-end groups statuses exposed to side areas of the stator core at positions aligned in a radial direction of the stator core. This enables increased surface areas of the coil-end groups to be utilized as surfaces areas to get cooling wind, resulting in a further increase in cooling capability.

With the stator for the vehicle alternator of the present embodiment, the small segment may preferably have a pair of straight portions disposed in one of the slots and the other one of the slots circumferentially distanced from the one of the slots by one pole-pitch, a pair of inclined portions axially extending outward from the axial end face of the stator core, and a turning portion integral with the pair of inclined portions to form a coil end. The large segment may preferably have a pair of straight portions disposed in the one of the slots and the other one of the slots circumferentially distanced from the one of the slots by one pole-pitch, a pair of inclined portions axially extending outward from the axial end face of the stator core, and a turning portion integral with the pair of inclined portions to form a coil end. The turning portions of the large and small segments may be circumferentially dislocated from each other to provide a circumferential space to create a cooling wind flow path to pass cooling wind in a radial direction of the stator core.

With such a structure, the stator winding can be formed of the electrical conductors in the shortest length, resulting in a reduction of a resistance value. In addition, the turning portions of the large and small segments are dislocated from each other in the circumferential direction of the stator core, thereby enabling an increase in the flow rate of cooling wind passing across the coil-end groups while making it possible to provide improved cooling capability. Furthermore, the turning portion of the large segment can have a decreased axial height with the resultant decrease in a length of an electric conductor needed for the stator winding to be formed. This makes it possible to reduce cost for producing the stator winding.

Another aspect of the present invention provides a vehicle alternator comprising a stator core formed with a plurality of slots and having a multi-phase stator winding, wound on the plurality of slots, which includes a plurality of segments composed of electrical conductors that are joined to each other to form the stator winding and a rotor rotatably disposed in the stator core and having an end face carrying thereon a cooling fan for creating a cooling wind in a radial direction of the rotor. The segments have inclined portions forming coil-ends extending from an axial end face of the stator core. Each of the segments includes a U-shaped large segment having a turning portion with a large size and a U-shaped small segment having a turning portion with a small size. The stator winding has a coil-end group, extending from one axial end face of the stator core, wherein the turning portion of the large segment and the turning portion of the small segment are dislocated from each other in a circumferential direction of the stator core and the turning portions of the large and small segments passing through the same slots overlap each other along an axial direction of the stator core.

With such a structure, the turning portions of the large and small segments can be bent so as to have decreased axial heights. Accordingly, this results in an increase in a gap between a frame of the alternator and the stator winding, thereby enabling an increase in the flow rate of cooling wind passing across the coil-end groups while making it possible to provide improved cooling capability. In addition, the turning portion of the large segment can have a decreased axial height with the resultant decrease in a length of an electric conductor needed for the stator winding to be formed. This enables a reduction in a resistance value, while making it possible to reduce cost for producing the stator winding.

With the vehicle alternator of the present embodiment, the small segment may preferably have a pair of straight portions disposed in one of the slots and the other one of the slots circumferentially distanced from the one of the slots by one pole-pitch, a pair of inclined portions axially extending outward from the axial end face of the stator core, and a turning portion integral with the pair of inclined portions to form a coil end. The large segment may preferably have a pair of straight portions disposed in the one of the slots and the other one of the slots circumferentially distanced from the one of the slots by one pole-pitch, a pair of inclined portions axially extending outward from the axial end face of the stator core, and a turning portion integral with the pair of inclined portions to form a coil end. The turning portions of the large and small segments may be circumferentially dislocated from each other to provide a circumferential space to create a cooling wind flow path to pass the cooling wind in the radial direction of the stator core.

With such a structure, the stator winding of the alternator can be formed of the electrical conductors in the shortest length, resulting in a reduction of a resistance value. In addition, the turning portions of the large and small segments are dislocated from each other in the circumferential direction of the stator core, thereby enabling an increase in the flow rate of cooling wind passing across the coil-end groups while making it possible to provide improved cooling capability. Furthermore, the turning portion of the large segment can have a decreased axial height with the resultant decrease in a length of an electric conductor needed for the stator winding to be formed. This makes it possible to reduce cost for producing the stator winding.

With the vehicle alternator of the present embodiment, the turning portions of the large and small segments have axial heights different from each other.

The turning portion of the large segment has a decreased axial height equal to the axial height of the turning portion of the small segment. This enables an increase in the flow rate of cooling wind passing across the coil-end groups of the stator winding. Also, the stator winding can have a reduced length to cause a reduction in a resistance value, enabling an increase in cooling capability. In addition, due to the presence of the large and small segments arranged to have the same axial heights, the large and small segments can be inserted to the associated slots at one time, making it possible to simplify the manufacturing process.

With the vehicle alternator of the present embodiment, the inclined portions of the segments may have circumferential spaces forming cooling wind flow paths to pass cooling wind in a radial direction of the stator core.

Such a structure allows both of the large and small segments to have the coil-end groups statuses exposed to side areas of the stator core at positions aligned in a radial direction of the stator core. This enables increased surface areas of the coil-end groups to be utilized as surfaces areas to get cooling wind, resulting in a further increase in cooling capability.

DETAILED DESCRIPTION OF THE PREFERRED EMBODIMENTS

Now, stators for vehicle alternators of various embodiments according to the present invention are described below in detail with reference to the accompanying drawings. However, the present invention is construed not to be limited to such embodiments described below and technical concepts of the present invention may be implemented in combination with other known technologies or the other technology having functions equivalent to such known technologies.

In the following description, like reference characters designate like or corresponding parts throughout the several views.

A vehicle alternator of an embodiment according to the present invention is described below with reference to the accompanying drawings.

First Embodiment

Figure 1:
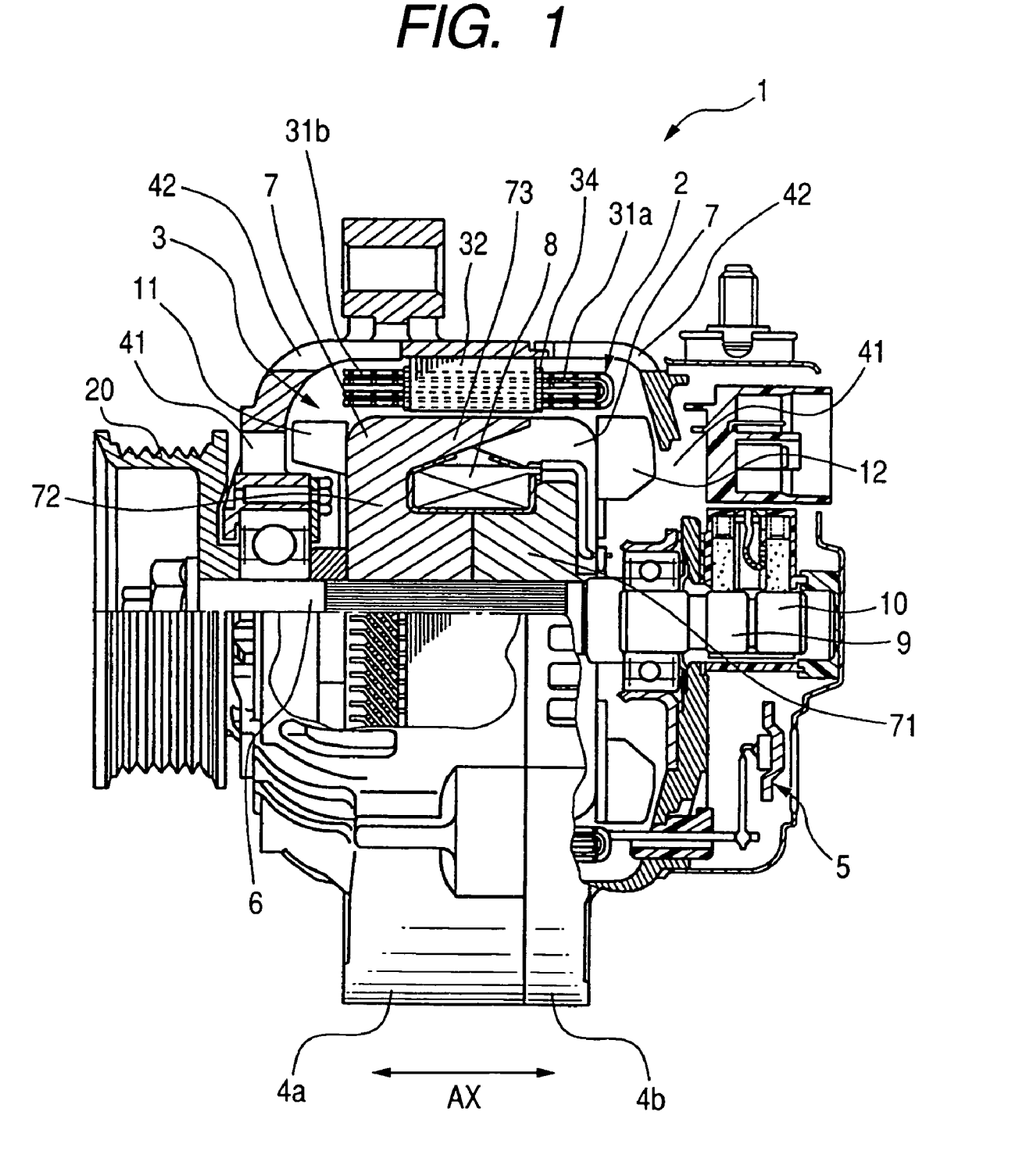
FIG. 1 is a cross-sectional view of a vehicle alternator of an embodiment according to the present invention.

FIG. 1 is a cross sectional view showing an overall structure of a vehicle alternator of an embodiment according to the present invention.

As shown in FIG. 1, the vehicle alternator 1 comprises a stator 2 which functions as an armature, a rotor 3 mounted on a shaft and rotatably disposed in the stator 2 to function as a magnetic field, front and rear frames 4a, 4b for supporting the rotor 3 and the stator 2, and a rectifier 5 disposed on for converting ac power to dc power.

The rotor 3, integrally rotatable with the shaft 6, comprises a Lundell type pole core 7, a field coil 8, slip rings 9, 10 formed on a rear end of the shaft 6, and front and rear cooling fans 11, 12 mounted on front and rear end faces of the rotor 3 to create cooling winds at front and rear areas of the rotor 3 in a radial direction.

The shaft 6 has a front end carrying thereon a pulley 20 operative to be driven by an engine (not shown) installed on a vehicle. The Lundell type pole core 7 includes one set of pole cores. The Lundell type pole core 7 is comprised of boss portions 71 mounted on the shaft 6, disc portions 72 extending radially from the boss portions 71 and having twelve claw poles 73 axially extending from the disc portions 72, respectively.

The front and rear frames 4a, 4b have front and rear walls formed with air intake openings 41, respectively. The front and rear frames 4a, 4b have upper peripheral shoulder portions formed with cooling wind ventilation openings 42 at positions radially outward of first and second coil end groups 31a, 31b of the stator 2.

Figure 2:
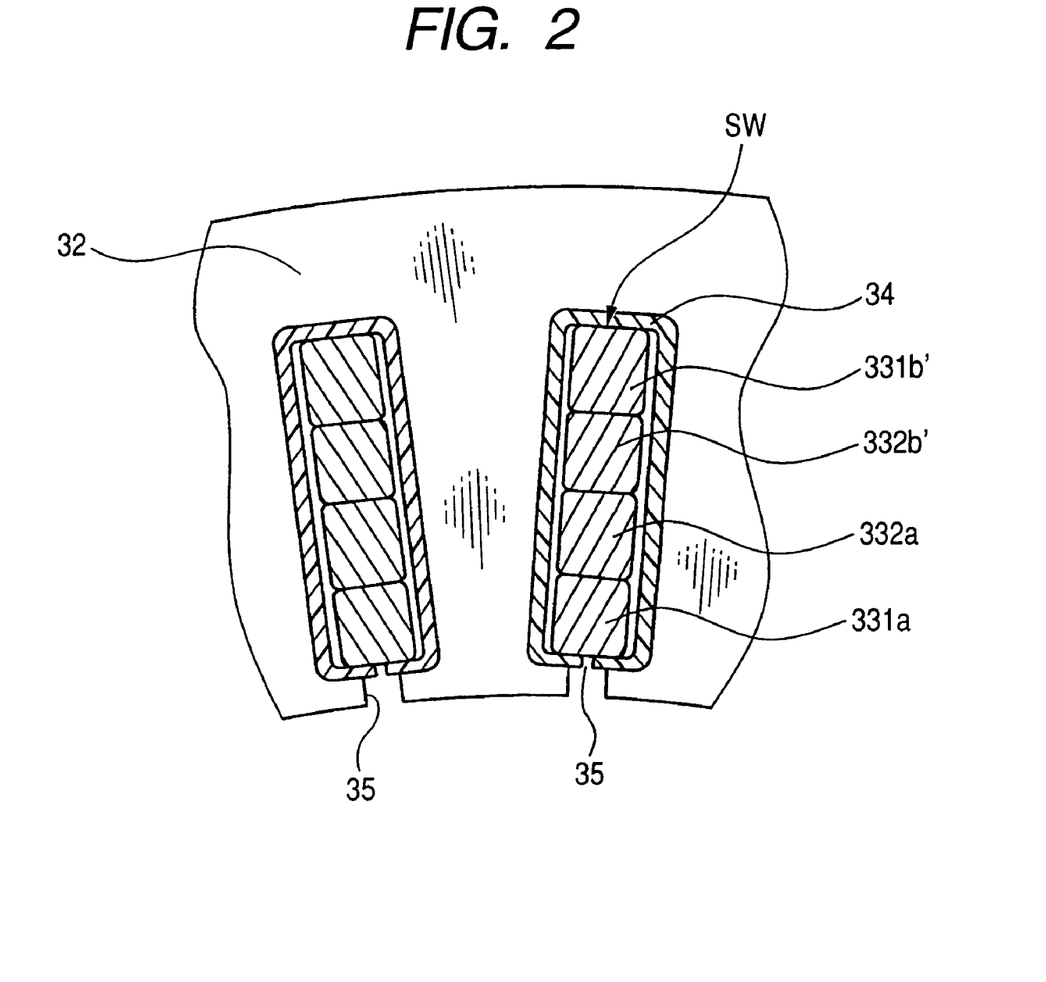
FIG. 2 is a fragmentary cross sectional view showing a stator of the present embodiment according to the present invention shown in FIG. 1.
Figure 3:
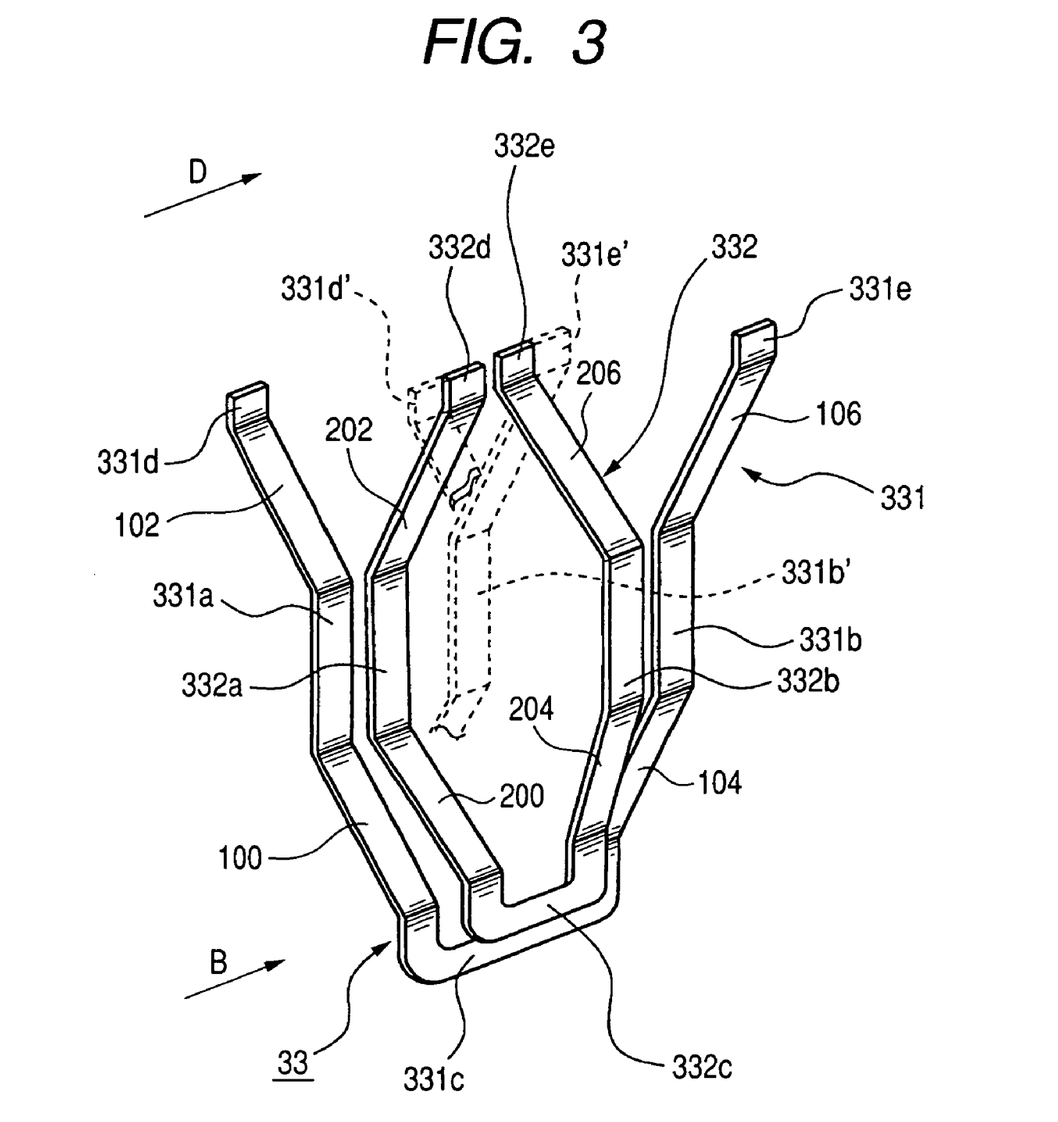
FIG. 3 is a perspective view showing a structure of a base segment forming a stator winding of the stator of the present embodiment.

FIG. 2 is a partial cross sectional view showing the stator 2 of the present embodiment shown in FIG. 1. FIG. 3 is a perspective view showing a base segment forming a stator winding.

As shown in FIGS. 2 and 3, the stator 2 comprises a stator core 32 having a plurality of radially extending slots 35 formed at equidistantly spaced positions, a multi-phase stator winding SW including a plurality of base segments composed of electrical conductors disposed in the slots 35 formed on an outer periphery of the stator core 32, and insulators 34 providing electrical insulation between the electrical conductors and the stator core 32.

As shown in FIG. 2, the radially extending slots 35 of the stator core 32 accommodate therein the multi-phase stator winding SW in a manner described below in detail. With the present embodiment, the stator core 32 has 36 slots 35 formed in equidistantly spaced positions along a circumferential periphery of the stator core 32.

The stator winding, inserted to the slots 35 of the stator core 32, is composed of single-electrical conductors arranged by one and one. Each of the plural slots 35 accommodates therein an even number of electrical conductors (four electrical conductors forming the four segments in the present embodiment). The four electrical conductors are sequentially aligned in one slot 35 at an innermost layer, an inner middle layer, an outer middle layer and an outermost layer along a radial direction of the stator core 32. These electrical conductors are connected in a given pattern to form the stator winding SW. With the present embodiment, moreover, the electrical conductors disposed in one slot 35 extend from opposite ends of the stator core 32 substantially in parallel to an axis thereof to form the coil-end groups 31a, 31b. The coil-end group 31a includes continuous wires and the coil-end group 31b includes free ends that are jointed to each other to form the base segments.

One electrical conductor disposed in one slot 35 makes a pair with another electrical conductor disposed in another slot 35 distanced from the one slot 35 by one pole-pitch. More particularly, in order to ensure a clearance between adjacent plural electrical conductors at the coil end portions to allow the electrical conductors to be arranged in given alignment, one electrical conductor located in a given layer of one slot 35 makes a pair with another electrical conductor in another layer of another slot 35 distanced from the one slot 35 by one pole-pitch.

For instance, an electrical conductor 331a of the large segment 331, disposed in the innermost layer of one slot 35, makes a pair with another electrical conductor 331b of the large segment 331, disposed in the outermost layer in another slot 35 distanced from the one slot 35 by one pole-pitch in a clockwise direction. Likewise, an electrical conductor 332a of the small segment 332, disposed in the inner middle layer of the one slot 35 makes a pair with another electrical conductor 332b of the small segment 332 in the outer middle layer in another slot 35 having the outermost layer accommodating another electrical conductor 331b of the large segment 331

The electrical conductors 331, 332 of these pairs are contiguous through the turning portions 331c, 332c, respectively, made of respective continuous wire portions to form the first coil-end group 31a on one side of the stator core 32. Thus, on one side of the stator core 32 where the first coil-end group 31a is present, the one continuous wire portion 331c of the electrical conductor 331 disposed in the innermost layer of the one slot 35 and disposed in the outermost layer of another slot 35 surrounds another continuous wire portion 332c of another electrical conductor 332 disposed in the outer middle layer of one slot 35 and disposed in the inner middle layer of another slot 35.

Thus, on one side of the stator core 32 where the first coil-end group 31a is present, a connecting portion of the electrical conductors forming one pair is surrounded with another connecting portion of the other electrical conductors disposed in the same slots and forming another pair. Connecting the electrical conductors disposed in the outer middle layer and the inner middle layer, respectively, to each other allows a coil end to be formed in single layer.

Meanwhile, an electrical conductor 332a disposed in the inner middle layer of one slot 35 makes a pair with another electrical conductor 331a' disposed in the innermost layer in another slot 35 distanced from the one slot 35 by one pole-pitch in the clockwise direction of the stator core 32. In the same manner, an electrical conductor 331b' disposed in the outermost layer in one slot 35 makes a pair with an electrical conductor 332b disposed in the outer middle layer of another slot 35 distanced from the one slot 35 by one pole-pitch in the clockwise direction of the stator core 32. Then, these electrical conductors are connected to each other by jointing on the other axially opposite side of the stator core 32.

Accordingly, on the other side of the stator core 32, the electrical conductor disposed in the outermost layer and the electrical conductor disposed in the outer middle layer have joint portions and the electrical conductor disposed in the innermost layer and the electrical conductor disposed in the inner middle layer have joints portions, with these joint portions being aligned in the radial direction of the stator core 32. Connecting the electrical conductor in the outermost layer and the electrical conductor in the outer middle layer to each other and connecting the electrical conductor in the innermost layer and the electrical conductor to each other allows the formation of coil ends in neighboring layers. Thus, on the other side of the stator core 32, the joint portions of the electrical conductors making the pairs are placed in given alignment not to overlap each other.

The electrical conductors have rectangular flat shapes in cross-section and are formed in given configurations to provide the base segments. As shown in FIG. 3, one electrical conductor in the innermost layer of one slot and another electrical conductor in the outermost layer of another slot are provided in the large segment 331 made of a single electric conductor formed in a U-shaped configuration. In addition, one electrical conductor in the inner middle layer of one slot and another electrical conductor in the outer middle layer of another slot are provided in the small segment 332 made of a single electric conductor formed in a U-shaped configuration.

The large and small segments 331, 332 form the base segment 33. The stator winding includes a plurality of base segments 33 disposed in the slots 35 on a regular basis on two turns around the stator core 32, thereby creating the stator winding. However, a turning portion forming a segment from which a lead wire of the stator winding is extracted and a turning portion for connecting the electrical conductors at first and second turns are formed in irregular segments different in shape from the base segment 33. With the present embodiment, the stator winding includes three irregular segments. The electrical conductor disposed in an end layer is connected to electrical conductor disposed a middle layer are connected to each other, thereby forming a coil end in an irregular shape.

Figure 4:
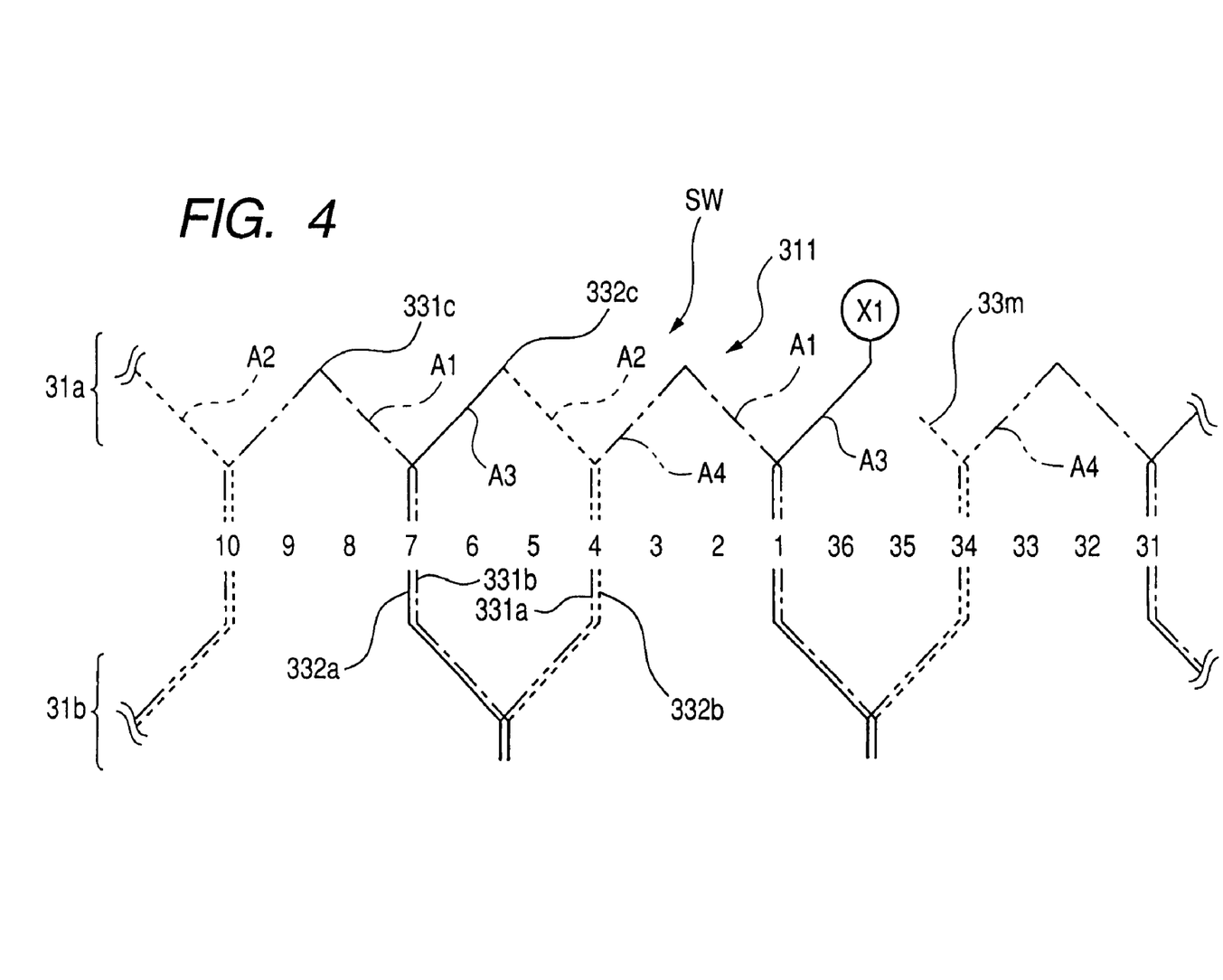
FIG. 4 is a winding specification diagram of the vehicle alternator of the present embodiment according to the present invention.
Figure 5:
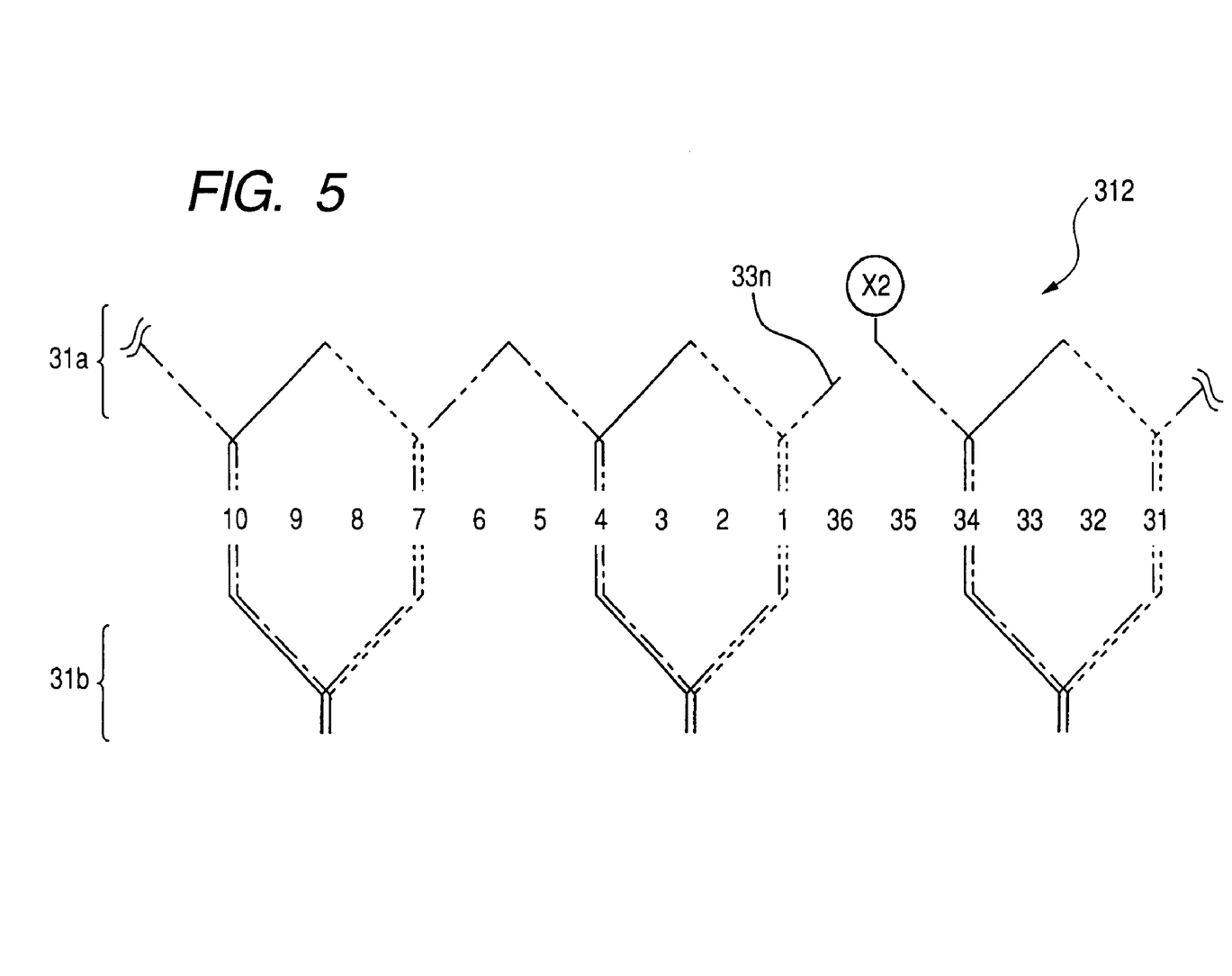
FIG. 5 is a winding specification diagram of the vehicle alternator of the present embodiment according to the present invention.
Figure 6:
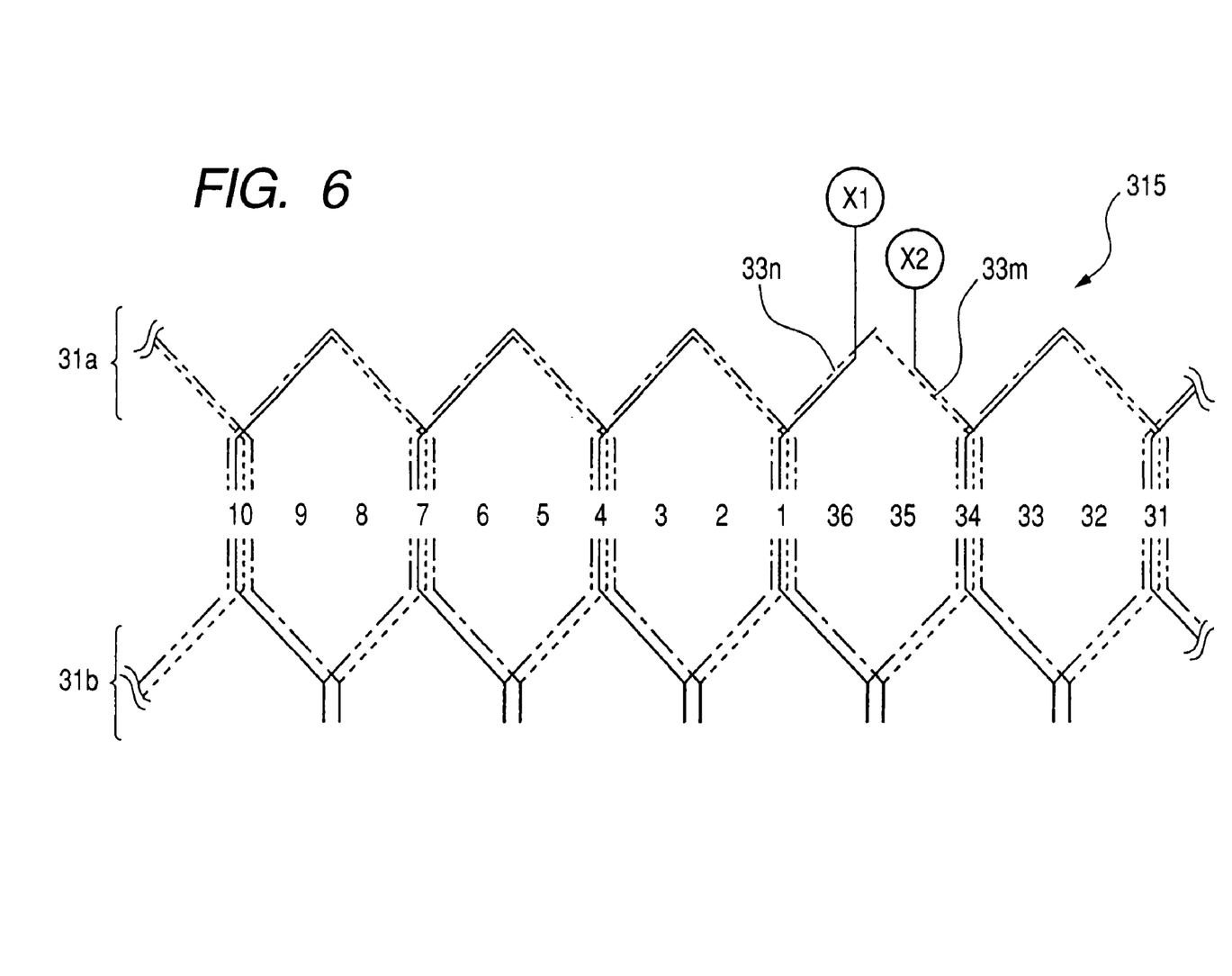
FIG. 6 is a winding specification diagram of the vehicle alternator of the present embodiment according to the present invention.

FIGS. 4 to 6 show winding specification diagrams for the vehicle alternator of the present embodiment in respect of an X-phase winding of three phase windings. A single dot line A1 indicates an electrical conductor disposed in the outermost layer of the slot 35. A broken line A2 indicates an electrical conductor disposed in the outer middle layer of the sot 35. A solid line A3 indicates an electrical conductor disposed in the inner middle layer. A double dot line A4 indicates an electrical conductor disposed in the innermost layer of the slot 35.

In addition, the stator winding SW has a first coil-end group 31a, composed of the turning portions, which is located on an upper stage in FIG. 4 and a second coil-end group 31b, composed of the joint portions, which is located on a lower stage in FIG. 4. Reference numerals aligned on the center transverse line of the base segments indicate the slot numbers.

Figure 7:
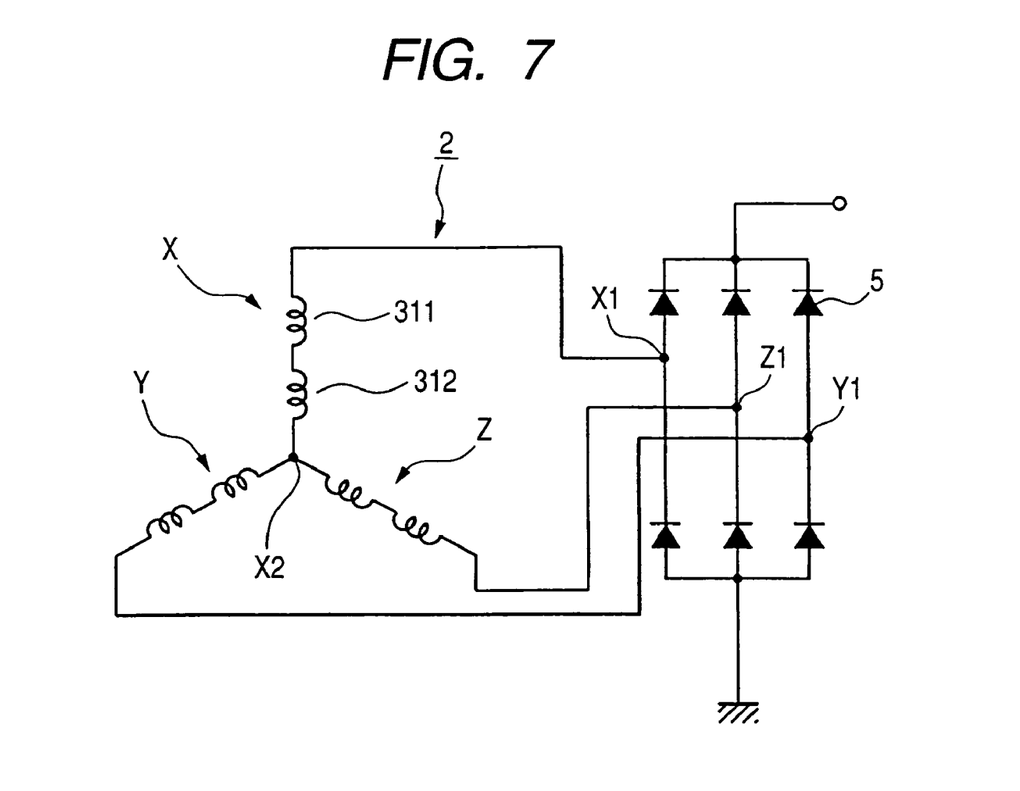
FIG. 7 is a connection diagram of the vehicle alternator of the present embodiment according to the present invention.

FIG. 7 shows a connection diagram of the vehicle alternator of the present embodiment. In FIG. 7, the multi-phase stator winding of the stator of the present invention is shown as comprising a three-phase winding in X-, Y- and Z-phases. The X-, Y- and Z-phase windings have output terminals X1, Y1 and Z1, which are connected the rectifier 5 for conversion of ac power to dc power.

As shown in FIG. 4, the base segments 33, corresponding to the X-phase, are inserted in every fourth slot from a slot No. 1. In the second coil-end group 31b, an end portion of the electrical conductor extending from the outer middle layer of one slot 35 is connected to an end portion of the electrical conductor extending from the outermost layer of another slot 35 distanced from the one slot 35 by one pole-pitch in the clockwise direction of the stator core 32. Likewise, an end portion of the electrical conductor extending from the innermost layer of one slot 35 is connected to an end of the electrical conductor extending from the inner middle layer of another slot 35 distanced from the one slot 35 by one pole-pitch in the clockwise direction of the stator core 32. Thus, a first winding 311 is formed in a two-turn lap winding per one slot. Likewise, as show in FIG. 5, a second winding 312 is formed in a two-turn lap winding per one slot. The first and second windings 311 and 312, shown in FIGS. 5 and 6, have end portions 33m and 33n, respectively, which are connected to each other, thereby forming a winding 315 with four turns per one slot.

A segment, having a turning portion with which the end portion 33m of the first winding 311 and the end portion 33n of the second winding 312 are connected to each other, has an irregular shape different in shape from the large and small segment 311, 312 forming the base segment 33 in regular shape. With the X-phase winding, the stator winding has three irregular segments including a first segment having a turning portion with which the end portion 33m of the first winding 331 and the end portion 33n of second winding 332 are connected to each other, a second segment having a winding end X1 and a third segment having a winding end X2. The reason why the number of irregular segments is limited to three can be explained below.

The first winding 311, shown in FIG. 4, can be obtained from an annular winding resulting from regular jointing conducted in the manner set forth above by cutting off the turning portion 332c of the small segment 332 inserted to the slot No. 1 and the slot No. 34. Likewise, the second winding 312 can be obtained from an annular winding resulting from regular jointing conducted in the manner set forth above by cutting off the turning portion 331c of the large segment 331 inserted to the slot No. 1 and the slot No. 34. One of the cut-off portions of the turning portion 331c is connected in series to one of the cut-off portions of the turning portion 332c with the other remaining cut-off portions of the respective turning portions being treated to act as winding ends, thereby forming the single winding 315. In such a way, these two annular windings are cut off at two positions upon which the cut-off portion of one annular winding and the cutout portion of another annular winding are connected to each other into a single winding, enabling the formation of a lap winding with four turns. Therefore, three irregular segments need to be provided.

Further, the irregular segments can be collectively disposed in an area of the first coil end group covering one pole-pitch. This is because, with the present embodiment, the turning portion 331c forms the first winding 311 and the turning portion 332c forms the second winding 312. Like the X-phase winding, a Y-phase winding and a Z-phase winding are disposed in the slots 35 different in phase by 120 degree. A winding end X1 of the X-phase winding and winding ends Y1, Z1 (not shown) of Y- and Z-phase windings are connected to the rectifier 5, with a winding end X2 and winding ends Y2, Z2 (not shown) being connected together to the neutral point. As shown in FIG. 7, these three phase-windings are connected to each other in a star connection. With the winding specification shown in FIG. 7, the winding end X1 connected to the rectifier 5 is axially extracted from the first coil-end group 31a.

Next, a method of manufacturing the stator winding is described below in detail.

When inserting the base segment 33, the two straight portions 332a, 332b of the U-shaped small segment 332 are aligned such that both sides of these straight portions are interleaved between the two straight portions 331a, 331b of the U-shaped large segment 331 in a radial direction of the stator core 32. With such arrangement, these component parts are inserted to the slots of the stator core 32 from one side thereof.

During such an assembling process, one electrical conductor 331a of the large segment 331 is disposed in the innermost layer of one slot 35; one electrical conductor 332a of the small segment 332 is disposed in the inner middle layer of the one slot 35; the other electrical conductor 331b of the large segment 331 is disposed in the outermost layer of the other slot 35 distanced from the one slot 35 of the stator core 32 by one pole-pitch in a clockwise direction; and the other electrical conductor 332b of the small segment 332 is disposed in the outer middle layer of the other slot 35.

As a result, the straight portions 331a, 332a, 332b', 331b' of the electrical conductors are located in the one slot 35 from the innermost layer in row as shown in FIG. 2. Here, the electrical conductors 332b', 331b' represent straight portions of the large and small segments formed in respective pairs with the electrical conductors disposed in the other slot 35 distanced from the one slot 35 by one-pole pitch.

After the inserting step, in the second coil-end group 31b, the electrical conductors prevailing in the outermost and innermost layers are bent to allow joint portions 331d, 331e to be inclined at an angle corresponding to 1.5 slots in a way to open the large segment 331. The electrical conductors in the inner and outer middle layers are bent to allow joint portions 332d, 332e to be inclined at an angle corresponding to 1.5 slots in a way to close the small segment 332.

The above steps are repeatedly carried out for assembling all of the base segments 33 in all of the slots 35. With the second coil-end group 31b, the joint portion 331e' of the electrical conductor in the outermost layer and the joint portion 332e of the outer middle layer and, also, the joint portion 332d of the electrical conductor in the inner middle layer and the joint portion 331d' of the electrical conductor in the innermost layer are joined and electrically connected by suitable techniques such as welding, ultrasonic wave welding, arc welding and soldering.

The base segment is made of a copper plate and formed into a substantially U-shaped configuration by press forming. The large and small segments may be individually formed. In an alternative, both of these segments may be formed of the copper plate at one time. In addition, the base segment 33 may be formed upon twisting the electrical conductor having a straight portion with a flat type in cross section. The turning portions 331c, 332c are not limited to particular U-shaped configurations shown in FIG. 3 and may be modified in circular arc shapes.

Figure 8:
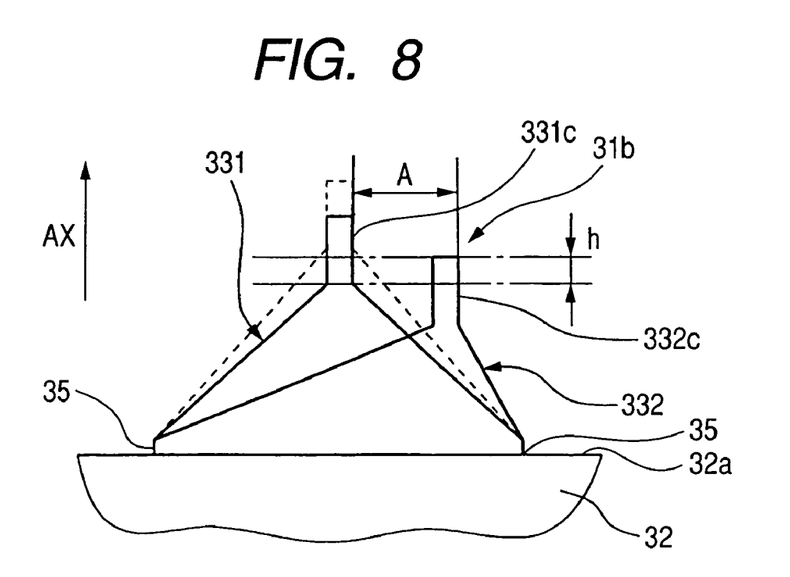
FIG. 8 is a schematic view showing the positional relationship between turning portions of large and small segments disposed in the same slots of the stator of the present embodiment.

With the present embodiment, in the first coil end group 31a formed on the one side of the stator core 32, the turning portions 331c, 332c of the large and small segments 331, 332, passing through the same slots 35, are dislocated from each other in a circumferential direction of the stator core 32 by a distance A as shown in FIG. 8. In addition, the turning portions 331c, 332c of the large and small segments 331, 332 overlap each other in areas along an axial direction AX of the stator core 32.

FIG. 8 is a schematic view, showing the positional relationship between the turning portions 331c, 332c of the large and small segments 331, 332 passing through the same slots 35, which illustrates a schematic configuration of the first coil end group 31a as viewed along an arrow B shown in FIG. 3.

As shown in FIG. 8, the turning portion 331c of the large segment 331 and the turning portion 332c of the small segment 332 overlap each other along a height of the coil end (that is, in a direction along the shaft 6) by a value of "h". Thus, for the purpose of permitting the turning portions 331c, 332c to overlap each other in such a way, the present embodiment is arranged such that in the first coil end group 31a formed on the stator core 32 on one side thereof in an area facing the axial end face 32a, the turning portions 331c, 332c of the large and small segments 331, 332 passing through the same slots 35 are dislocated in the circumferential direction by a distance A and, to this end, the turning portions 331c, 332c covering respective twisted portions (inclined portions) are twisted at positions not to cause mutual interference to occur for thereby forming the coil end.

Thus, the turning portions 331c, 332c of the large and small segments 331, 332 passing through the same slots 35 are dislocated from each other in the circumferential direction by the distance A and the turning portions 331c, 332c of the large and small segments 331, 332 overlap each other in the axial direction of the stator core 32. This makes it possible to bend the turning portion 331c of the large segment 331 in the same extent in which the turning portion 332c of the small segment 332 is bent, enabling a reduction in an axial height of the turning portion 331c of the large segment 331. Consequently, this results in an increase in a gap between the stator winding and the frame 4, enabling an increase in the flow rate of cooling wind with the resultant increase in cooling capability. In addition, decreasing the axial height of the turning portion 331c of the large segment 331 results in a shortened length of an electric conductor needed for the formation of the stator winding. This enables a reduction in a resistance value, making it possible to achieve a reduction in cost of producing the stator winding.

Figure 9:
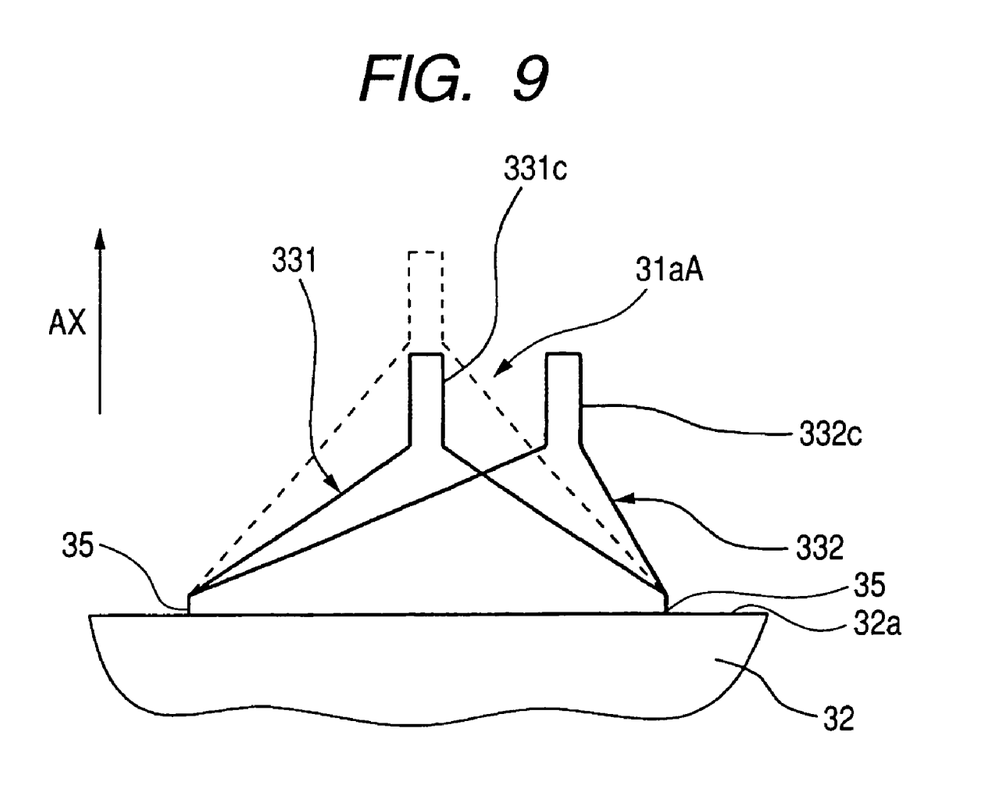
FIG. 9 is a schematic view of a modified form of the stator wherein the turning portions of the large and small segments disposed in the same slots have the same axial heights.

FIG. 9 is a schematic view showing a modified form of the first coil end group 31a. With a first coil end group 31aA in such a modified form, the turning portions 331c, 332c of the large and small segments 331, 332 passing through the same slots 35 are aligned to have the same axial heights. Lowering a height of the turning portion 331c of the large segment 331 such that the turning portion 331c of the large segment 331 has the same axial height as that of the turning portion 332c of the small segment 332 enables a further increase in the flow rate of cooling wind passing across the first coil end group 31aA. This also achieves a reduction in a length of the stator winding with the resultant increase in cooling capability.

Moreover, since the large segment 331 and the small segment 332 have the same axial height, the large and small segments 331, 332 can be inserted to the slots 35 during assembly at one time, making it possible to simplify the assembling steps.

Meanwhile, the base segment 33 comprises the inclines portions forming the coil ends that protrude from the end faces of the stator core 32 on both sides thereof. More particularly, as shown in FIG. 3, the inclined portions of the large segment 331 include an inclined portion 100 between the straight portion 331a and the turning portion 331c, an inclined portion 102 between the straight portion 331a and the joint portion 331d, an inclined portion 104 between the straight portion 331b and the turning portion 331c and an inclined portion 106 between the straight portion 331a and the joint portion 331e.

Likewise, the inclined portions of the small segment 332 include an inclined portion 200 between the straight portion 332a and the turning portion 332c, an inclined portion 202 between the straight portion 332a and the joint portion 332d, an inclined portion 204 between the straight portion 332b and the turning portion 332c and an inclined portion 206 between the straight portion 332a and the joint portion 332e.

These inclined portions 102 to 106 of the large segment 331 and the inclined portions 200 to 206 of the small segment 332 form parts of the coil end portions of the large and small segments 331, 332. These inclined portions form parts of the large and small segments 331, 332 that are located in areas spaced from each other on a regular basis in a circumferential direction of the stator core 32 by a given distance.

With such a structure, the cooling fans 11, 12, mounted on the rotor 3 on both sides thereof at areas radially inward of the stator core 32, create cooling wind streams that pass through cooling wind flow paths defined between the adjacent inclined portions of the base segments 33 mounted on the stator core 32. Upon dislocating the turning portion 331c of the large segment 331 and the turning portion 332c of the small segment 332 from each other in the circumferential direction of the stator core 32, both of the inclined portions of the large segment 331 and the inclined portions of the small segment 332 remain under exposed states. This results in capability of effectively utilizing increased surfaces areas of the coil end groups 31a, 31b as surface areas getting cooling wind, making it possible to provide improved cooling capability.

While the specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention, which is to be given the full breadth of the following claims and all equivalents thereof.

What is claimed is:

1. A stator for a vehicle alternator comprising:
   a stator core formed with a plurality of slots; and
   a multi-phase stator winding wound on the plurality of slots of the stator core and including a plurality of segments composed of electrical conductors that are joined to each other to form the stator winding;
   wherein the segments have inclined portions forming coil ends extending from an axial end face of the stator core;
   each of the segments includes a U-shaped large segment having a turning portion with a large size and a U-shaped small segment having a turning portion with a small size;
   the stator winding has a coil-end group, extending from one axial end face of the stator core, wherein the turning portion of the large segment and the turning portion of the small segment are dislocated from each other in a circumferential direction of the stator core and the turning portions of the large and small segments passing through the same slots overlap each other along an axial direction of the stator core; and wherein
   the turning portions of the large and small segments passing through the same slots have the same axial heights.

2. The stator for the vehicle alternator according to claim 1, wherein:
   the inclined portions of the segments have circumferential spaces forming cooling wind flow paths to pass cooling wind in a radial direction of the stator core.

3. The stator for the vehicle alternator according to claim 1, wherein:
   the small segment has a pair of straight portions disposed in one of the slots and the other one of the slots circumferentially distanced from the one of the slots by one pole-pitch, a pair of inclined portions axially extending outward from the axial end face of the stator core, and a turning portion integral with the pair of inclined portions to form a coil end;
   the large segment has a pair of straight portions disposed in the one of the slots and the other one of the slots circumferentially distanced from the one of the slots by one pole-pitch, a pair of inclined portions axially extending outward from the axial end face of the stator core, and a turning portion integral with the pair of inclined portions to form a coil end; and
   the turning portions of the large and small segments are circumferentially dislocated from each other to provide a circumferential space to create a cooling wind flow path to pass cooling wind in a radial direction of the stator core.

4. A vehicle alternator comprising:
   a stator core formed with a plurality of slots and having a multi-phase stator winding, wound on the plurality of slots, which includes a plurality of segments composed of electrical conductors that are joined to each other to form the stator winding; and
   a rotor rotatably disposed in the stator core and having an end face carrying thereon a cooling fan for creating a cooling wind in a radial direction of the rotor;
   wherein the segments have inclined portions forming coil-ends extending from an axial end face of the stator core;
   each of the segments includes a U-shaped large segment having a turning portion with a large size and a U-shaped small segment having a turning portion with a small size;
   the stator winding has a coil-end group, extending from one axial end face of the stator core, wherein the turning portion of the large segment and the turning portion of the small segment are dislocated from each other in a circumferential direction of the stator core and the turning portions of the large and small segments passing through the same slots overlap each other along an axial direction of the stator core; and wherein
   the turning portions of the large and small segments passing through the same slots have the same axial heights.

5. The vehicle alternator according to claim 4, wherein:
   the small segment has a pair of straight portions disposed in one of the slots and the other one of the slots circumferentially distanced from the one of the slots by one pole-pitch, a pair of inclined portions axially extending outward from the axial end face of the stator core, and a turning portion integral with the pair of inclined portions to form a coil end;

the large segment has a pair of straight portions disposed in the one of the slots and the other one of the slots circumferentially distanced from the one of the slots by one pole-pitch, a pair of inclined portions axially extending outward from the axial end face of the stator core, and a turning portion integral with the pair of inclined portions to form a coil end; and the turning portions of the large and small segments are circumferentially dislocated from each other to provide a circumferential space to create a cooling wind flow path to pass the cooling wind in the radial direction of the stator core.

6. The vehicle alternator according to claim 4, wherein:

the turning portions of the large and small segments have axial heights different from each other.

7. The vehicle alternator according to claim 4, wherein:

the inclined portions of the segments have circumferential spaces forming cooling wind flow paths to pass cooling wind in a radial direction of the stator core.

* * * * *